US012634460B2

(12) United States Patent
Estrada et al.

(10) Patent No.: US 12,634,460 B2
(45) Date of Patent: May 19, 2026

(54) VISUAL QUALITY SIGNALLING MECHANISM

(71) Applicant: ARRIS Enterprises LLC, Horsham, PA (US)

(72) Inventors: Domingo Guzman Estrada, Salinas Victoria (MX); Claudio Canseco Campoy, Monterrey (MX)

(73) Assignee: ARRIS Enterprises LLC, Horsham, PA (US)

( * ) Notice: Subject to any disclaimer, the term of this patent is extended or adjusted under 35 U.S.C. 154(b) by 2 days.

(21) Appl. No.: 18/678,699

(22) Filed: May 30, 2024

(65) Prior Publication Data
US 2024/0406395 A1     Dec. 5, 2024

Related U.S. Application Data

(60) Provisional application No. 63/469,715, filed on May 30, 2023.

(51) Int. Cl.
*H04N 19/124* (2014.01)
*H04N 19/136* (2014.01)
*H04N 19/172* (2014.01)
*H04N 19/176* (2014.01)
*H04N 19/44* (2014.01)

(52) U.S. Cl.
CPC ......... *H04N 19/124* (2014.11); *H04N 19/136* (2014.11); *H04N 19/172* (2014.11); *H04N 19/176* (2014.11); *H04N 19/44* (2014.11)

(58) Field of Classification Search
CPC .... H04N 19/176; H04N 19/61; H04N 19/124; H04N 19/147; H04N 19/70; H04N 19/14; H04N 19/126; H04N 19/154; G06T 2207/30168; G06T 9/00
See application file for complete search history.

(56) References Cited

U.S. PATENT DOCUMENTS

2012/0269266 A1* 10/2012 Lin ...................... H04N 19/162
375/240.03

* cited by examiner

*Primary Examiner* — Farhan Mahmud
(74) *Attorney, Agent, or Firm* — Chernoff, Vilhauer, McClung & Stenzel, LLP

(57) ABSTRACT
A system for software download compatibility.

8 Claims, 2 Drawing Sheets

VISUAL QUALITY SIGNALLING MECHANISM

CROSS REFERENCE TO RELATED APPLICATIONS

The present application claims priority to U.S. Provisional Application No. 63/469,715 filed May 30, 2023, the contents of which are each incorporated herein by reference in their entirety.

BACKGROUND

The subject matter of this application relates to a mechanism for visual quality signalling.

Digital video communications is widely deployed across streaming services, video on demand services, telephony, among a multitude of other services. Many different video coding standards have been developed, such as H.261 which is suitable for low bit rate communications, MPEG-1 standard with improved video quality, and further development including MPEG-2, MPEG-4, H.263, H.264, H.265, VVC, AV1, VP9, etc. At the core of such standards is the hybrid video coding technique of block motion compensation plus transform coding. Block motion compensation is used to remove temporal redundancy between successive pictures (frames or top/bottom fields), whereas transform coding is used to remove spatial redundancy within each picture.

Traditional block motion compensation schemes basically assume that between successive frames an object in a scene undergoes a displacement in the x- and y-directions and these displacements define the components of a motion vector. Thus, an object in one frame can be predicted from the object in a prior frame by using the object's motion vector. Block motion compensation partitions a frame into blocks and treats each block as an object and then finds (motion estimation) a motion vector which locates the most-similar block in the prior frame. The most-similar block is a prediction of the current block and this prediction block can be encoded by the motion vector.

By way of example, a frame may be partitioned into macroblocks where each macroblock contains four 8×8 luminance (Y) blocks plus two 8×8 chrominance (Cb and Cr or U and V) blocks, although other block sizes (e.g., square and/or rectangular) maybe used. The frame can be encoded either with motion compensation or without motion compensation. An I-frame is encoded without motion compensation ("intra-coded") by simply applying the transform, quantization, and variable-length coding to each macroblock (or prediction error block using adjacent-pixel prediction). In contrast, a P-frame (uni-directional) or a B-frame (bidirectional) is encoded ("inter-coded") with motion compensation and a macroblock is encoded by its motion vector plus the transform, quantization, and variable-length coding of its residual block (prediction error block from the motion vector located block). The transform of a block converts the pixel values of a block from the spatial domain into a frequency domain; this takes advantage of decorrelation and energy compaction of transforms such as the two-dimensional discrete cosine transform (DCT) to make the quantization more effective.

To manage the bit-rate and maintain sufficient visual quality, many different parameters may be adjusted. A principal parameter that adjusts the rate control is a quantization parameter that may be adapted to provide a target transmission bit rate. A larger quantization parameter implies smaller quantized transform coefficients which means fewer and/or shorter variable-length codewords and consequently lower bit rates and/or smaller files. One of the trade-offs for such larger quantization parameters means more distortion in the decoded frames. Other parameters likewise result in changes in the bit-rate and visual quality of the resulting video.

In such real-world scenarios, the encoder deals with unfavourable situations like damage on the input stream or a lack of available bitrate that fits the complexity of the current scene. To overcome some of those situations, the encoder determines to increase QP as much as possible with the aim to reduce bitrate usage, but at the same time, rate control tries to set QP to a lower value due to a decrease in the VQ produced by a low QP. Leading the encoder to a dilemma between decreasing bitrate and increasing VQ, which in most of the situations negatively affects VQ on the output encoded stream.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
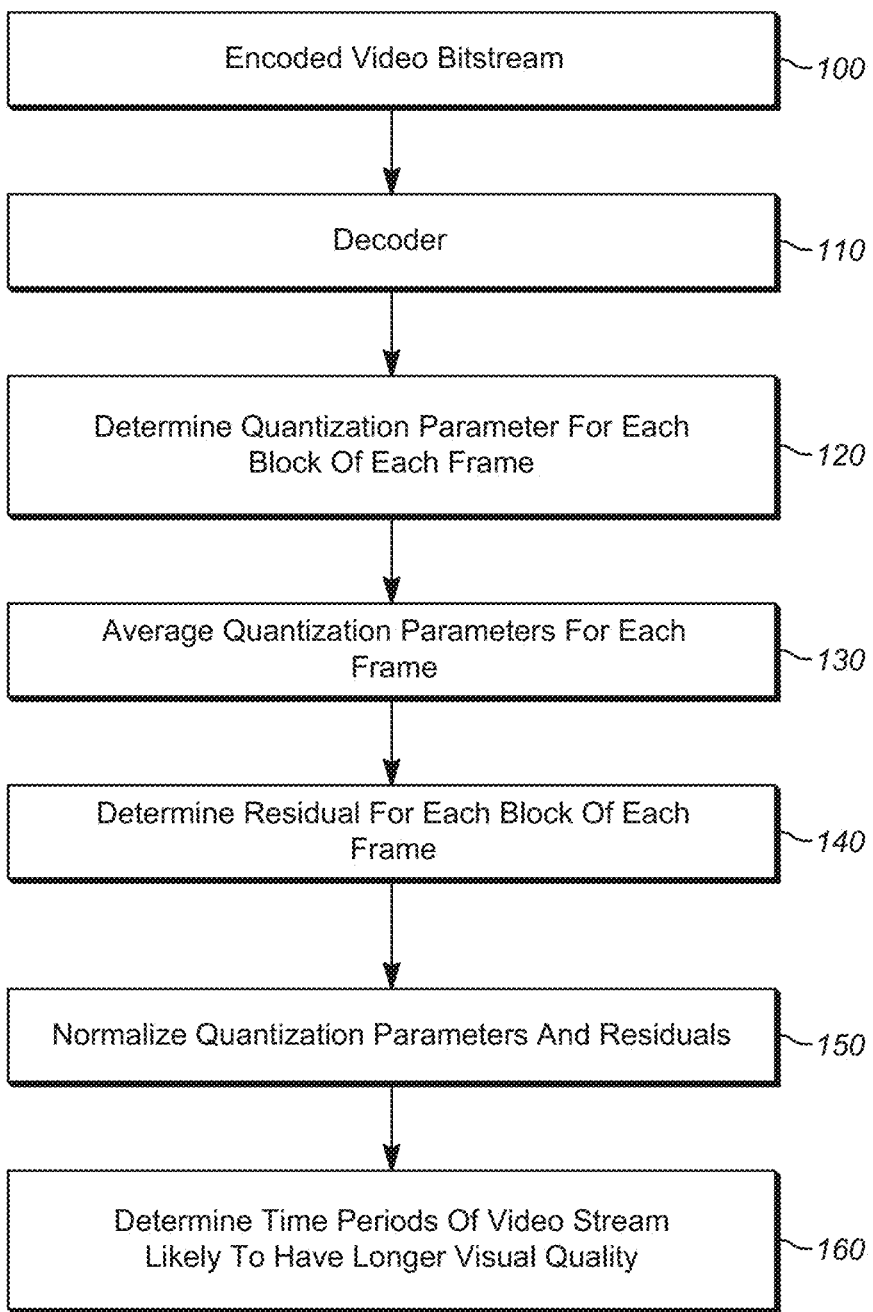
FIG. 1 illustrates a video processing system.

The classical technique for making encoding decisions is for the video encoder to choose the result which yields the highest quality output image. However, this has the disadvantage that the choice it makes might require more bits while giving comparatively little quality benefit. For example, using quarter pixel-precision motion estimation tends to increase the video quality, albeit with substantial increase in the required number of bits. For example, using small quantization of the pixels, tends to increase the visual quality.

Video encoding methods such as the MPEG families are lossy processes. They achieve compression by removing redundant information, and by removing smalls amounts of information in a way that compromises quality in a not perceptible way. Simplified version of the encoding process could be summarized in the following steps: (1) picture partitioning, (2) intra prediction/inter prediction, (3) transform coding, (4) entropy coding, and (5) reconstruction and buffering.

In MPEG a video sequence is composed by a series of continuous frames, also known as Group of Pictures (GOP). Video encoding accomplishes compression through taking advantage of spatially and temporal redundancies, by inferring samples from its neighborhood within same picture or by coding differences between frames instead of complete pictures and the encoder select the best coding mode based on distortion measures. Residual information obtained from the inter and intra prediction, which is the difference between the predicted image and the original one, are transform coded using different transforms techniques, and subsequently is quantized according to a quantization parameter. Subsequently, intra and inter information together with quantized residual information are entropy coded. The resulting data is ready for later processing such as storage or transmission.

One example of this visual quality is in motion estimation, and in particular regarding the use of quarter pixel-precision motion estimation. Adding the extra precision to the motion of a block during motion estimation might increase visual quality, but in some cases that extra quality isn't worth the extra bits necessary to encode the motion vector to a higher precision. Another technique involves using small pixel quantization, which results in maintaining a greater image quality. However, using small pixel quantization might increase visual quality, but often the extra quality isn't worth the extra bit necessary to encode the pixels. Contrary, using large pixel quantization, results in a lower image visual quality with fewer resulting bits.

Rate-distortion optimization reduces the aforementioned problem by acting as a video quality metric, measuring both the deviation from the source material and the bit cost for each possible decision outcome. The bits may be mathematically measured by multiplying the bit cost by the Lagrangian, a value representing the relationship between bit cost and quality for a particular quality level. The deviation from the source is usually measured as the mean squared error, in order to maximize the peak signal-to-noise ratio video quality metric.

Calculating the bit cost is made more difficult by the entropy encoders in some video codecs, requiring the rate-distortion optimization algorithm to pass each block of video to be tested to the entropy coder to measure its actual bit cost. In Motion Picture Experts Group codecs, the full process includes a discrete cosine transform, followed by quantization and entropy encoding. Because of this, rate-distortion optimization is much slower than most other block-matching metrics, such as the simple sum of absolute differences (SAD) and sum of absolute transformed differences (SATD). As such it is usually used only for the final steps of the motion estimation process, such as deciding between different partition types.

While such rate-distortion optimization techniques are suitable for encoders, they fail to provide information regarding the visual quality of video content being provided to end users. For example, a cable provider may be providing different video content to their customers from a variety of different sources. Some of the video content may have relatively high visual quality, some of the video content may have a relatively low visual quality, while some of the video content may include portions therein that have low visual quality. Also, the cable provider does not typically perform the video encoding, nor typically have any control over the video encoding.

To determine the visual quality of the resulting video content being provided, it is desirable to measure the visual quality of the video. Measuring visual quality is complex and subjective in many situations because there are several factors, relative to the observer, that can affect the results. Objective quality metrics are designed to measure the quality of video predicting the observer experience. The most common techniques used as an image quality evaluation metric are the peak signal-to-noise ratio and structural similarity index measure. In general, two consecutive sets of images are being compared, the reference video and the video under analysis, and a similarity metric is obtained through a set of methods, a higher score is obtained, the closest similarity between the two videos. Unfortunately, the source image content is typically not available for video content rendering such techniques inappropriate.

Referring to FIG. 1, it was determined that the visual quality of portions of the encoded video stream may be compared with respect to other portions of the encoded video stream by measuring particular parameters that are decoded from within the encoded bitstream. This is performed without reference to the source material, and only based upon the video stream itself. The system may include a decoder 110 that decodes the encoded video bitstream 100. One of the parameters that was determined is related to the visual quality of the encoded video is the quantization parameter, an in particular the quantization parameter for each of the encoded blocks of each frame 120. Also, it was determined that the quantization parameters tends to significantly vary across a frame for each of the particular blocks, therefore it is desirable to average (or any other suitable statistical measure) the quantization parameters for each of the blocks of each frame which provides an average quantization parameter more representative of each frame 130. In this manner, the system determines an average quantization parameter for each frame of a video stream.

Another of the parameters that was determined is related to the visual quality of the encoded video is the residual, an in particular the residual for each of the encoded blocks of each frame 140. Also, it was determined that the residual tends to significantly vary across a frame for each of the particular blocks, therefore it is desirable to average (or any other suitable statistical measure) the residual for each of the blocks of each frame which provides an average residual more representative of each frame 150. In this manner, the system determines an average residual for each frame of a video stream.

The quantization parameters and residuals may be normalized 150, if desired. The normalization quantization parameters and residuals may be processed to determine those temporal time periods of the video stream that are likely to have lower visual quality 160.

Figure 2:
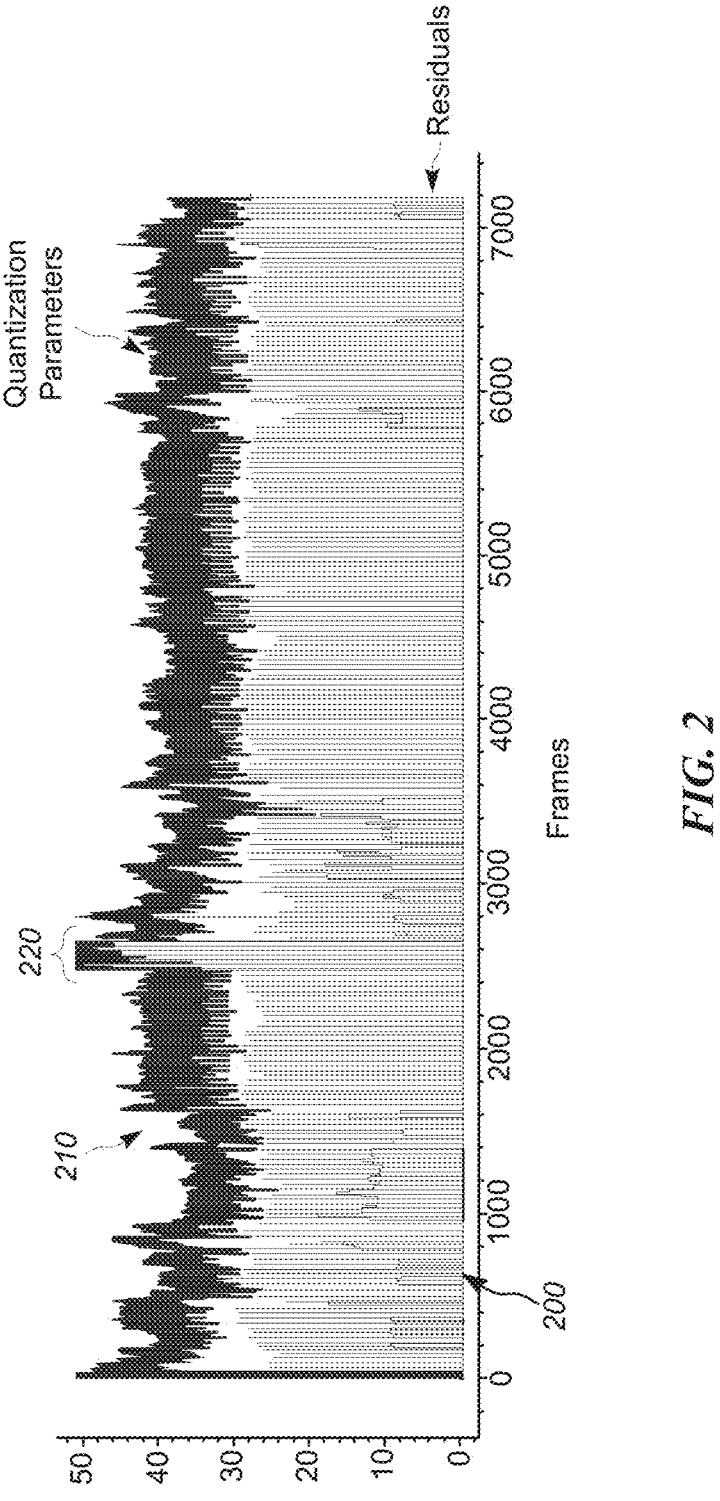
FIG. 2 illustrates a temporal graph of quantization parameters and residuals.

Referring to FIG. 2, the temporal set of normalized residuals 200 may be processed with a temporal measure, such as a standard deviation. In this manner, those residuals that are sufficiently outside the mean, such as outside of 1 or 2 standard deviations may be determined. This provides residual candidate frames and/or temporal time periods where the visual quality may be degraded. In a similar manner, the temporal set of normalized quantization parameters 210 may be processed with a temporal measure, such as a standard deviation. In this manner, those quantization parameters that are sufficiently outside the mean, such as outside of 1 or 2 standard deviations may be determined. This provides quantization parameter candidate frames and/or temporal time periods where the visual quality may be degraded. The overlapping regions of the residual candidate frames and/or temporal time periods and the quantization parameter candidate frames and/or temporal time periods 220.

The identified frames and/or time periods may be provided to a provider of the video content in order to modify or otherwise select different video content. For example, a provider of video content may select between different sources of video content, where each of them may have different encoding, based upon the identified candidate frames and/or temporal time periods that may include degraded visual quality. For example, a provider of video content may select between different encoded video segments of video content, such as HTTP Live Streaming and/or Dynamic Adaptive Streaming over HTTP video streams, where each of them may have different encoding, based upon the identified candidate frames and/or temporal time periods that may include degraded visual quality.

Moreover, each functional block or various features in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

We claim:

1. A method for processing a decoded video comprising a plurality of frames, each frame comprising a plurality of blocks, said method comprising:

(a) for each of said plurality of frames, determining a quantization parameter for each of said plurality of blocks of said each of said plurality of frames of said video with reference only to said decoded video;

(b) determining a representative quantization parameter for each of said plurality of frames based upon said plurality of quantization parameters for said plurality of blocks of said each of said plurality of frames;

(c) for each of said plurality of frames, determining a residual for each of said plurality of blocks of said each of said plurality of frames of said video, with reference only to said decoded video;

(d) determining a representative residual for each of said plurality of frames based upon said plurality of residuals for said plurality of blocks of said each of said plurality of frames;

(e) determining a temporal representative quantization parameter for said plurality of frames of said video based upon each respective representative quantization parameter of each of said plurality of frames;

(f) determining a temporal representative residual for said plurality of frames of said video based upon each respective representative residual of each of said plurality of frames;

(g) determining a portion of said video having lower visual quality based upon at least one of (1) a difference between said temporal representative quantization parameter and said respective representative quantization parameters for said plurality of frames of said video, and (2) a difference between said temporal representative residual and said respective representative residuals for said plurality of frames of said video.

2. The method of claim 1 wherein said representative quantization parameter is based upon an average of said plurality of quantization parameters for said plurality of blocks of said frame.

3. The method of claim 1 wherein said representative residual is based upon an average of said plurality of residuals for said plurality of blocks of said frame.

4. The method of claim 1 wherein said representative quantization parameter is based upon an average of said plurality of quantization parameters for said plurality of blocks of said frame, and said representative residual is based upon an average of said plurality of residuals for said plurality of blocks of said frame.

5. The method of claim 1 wherein said difference is based upon a standard deviation of said plurality of said respective representative quantization parameters for said plurality of frames of said video.

6. The method of claim 1 wherein said portion of said difference is based upon a standard deviation of said plurality of said respective representative residuals for said plurality of frames of said video.

7. The method of claim 1 wherein (1) said difference is based upon a standard deviation of said plurality of said respective representative quantization parameters for said plurality of frames of said video, and (2) said difference is based upon a standard deviation of said plurality of said respective representative residuals for said plurality of frames of said video.

8. The method of claim 1 wherein based upon said determining said portion of said video having lower visual quality, a different encoded video segment is selected containing video content that is the same as contained in said portion of said video having lower visual quality.

* * * * *